United States Patent
Bass

(10) Patent No.: US 7,988,032 B2
(45) Date of Patent: Aug. 2, 2011

(54) METHOD OF WELDING TUBULAR COMPONENTS

(75) Inventor: Kevin D. Bass, Loughborough (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/706,745

(22) Filed: Feb. 17, 2010

(65) Prior Publication Data

US 2010/0213245 A1    Aug. 26, 2010

(30) Foreign Application Priority Data

Feb. 25, 2009  (GB) .................................. 0903101.4

(51) Int. Cl.
*B23K 20/12*    (2006.01)
(52) U.S. Cl. ...................... 228/112.1; 228/113; 228/114; 228/2.1
(58) Field of Classification Search ............... 228/112.1, 228/113, 114, 2.1
See application file for complete search history.

(56) References Cited

U.S. PATENT DOCUMENTS

| | | | | |
|---|---|---|---|---|
| 1,853,439 | A * | 4/1932 | Lawrence | 148/633 |
| 3,121,948 | A * | 2/1964 | Camps-Campins et al. | 228/114 |
| 3,501,981 | A * | 3/1970 | Katunich et al. | 82/137 |
| 3,525,144 | A | 8/1970 | Katunich et al. | |
| 4,063,676 | A * | 12/1977 | Lilly | 228/114 |
| 5,849,146 | A * | 12/1998 | Searle et al. | 156/580 |
| 6,198,805 | B1 | 3/2001 | Jambunathan et al. | |
| 6,334,571 | B1 * | 1/2002 | Shantz et al. | 228/256 |

FOREIGN PATENT DOCUMENTS

| | | |
|---|---|---|
| EP | 0 395 385 A3 | 10/1990 |
| JP | A 10-263851 | 10/1998 |
| JP | 2005271015 A * | 10/2005 |

OTHER PUBLICATIONS

English computer translation of JP2005271015A.*
Apr. 22, 2009 Search Report issued in British Patent Application No. 0903101.4.
European Search Report issued in corresponding European Application No. 10 25 0268, completed Jun. 18, 2010.

* cited by examiner

*Primary Examiner* — Jessica L Ward
*Assistant Examiner* — Erin B Saad
(74) *Attorney, Agent, or Firm* — Oliff & Berridge, PLC

(57) ABSTRACT

Two tubular components (10, 14) are provided with integral end caps (11, 15). The end caps (11, 15) are placed in abutting relationship and are held together under pressure whilst the tubular component (10) is rotated. A pressure is applied and this causes frictional heating. A friction welded joint (18) occurs at the interface between the two end caps (11, 15). On completion of the welding process a machining tool is then passed through the internal bore (12 or 16) in either of the tubular components. The machining tool cuts through the joined end caps (11, 15) to produce a single uniform bore thorough the joined components. In a further post processing operation the extruded flash (20) is removed from the outer surfaces (13, 17).

13 Claims, 1 Drawing Sheet

METHOD OF WELDING TUBULAR COMPONENTS

The present invention relates to a method of welding tubular components and in particular to a method of welding together tubes by friction or inertia welding techniques.

In friction or inertia welding components are joined by a solid phase process in which heat is generated by friction to produce a high integrity welded joint.

When joining tubular components, by inertia or friction welding, flash is expelled from both the internal and external surfaces. A post processing operation is therefore required to remove this flash from both the internal and external diameters on completion of the welding process. However due to the high heating and cooling rates typically observed during these welding techniques it is difficult to remove the flash material. The access and ease with which the flash can be removed from the internal surfaces is further compounded when the tubular sections have a small inside diameter. The removal of the flash generating during the welding process is therefore both difficult and time consuming.

The present invention overcomes the aforementioned problems and seeks to provide a simplified method of joining tubular components.

According to the present invention a method of joining tubular components together comprises the steps of;
providing an integral cap of material at one end of each of the tubular components to be joined,
placing the capped ends of the tubular components in an abutting relationship,
holding the capped ends of the tubular components in abutment and applying a pressure whilst at least one of the components is rotated to generate frictional heat to weld the capped ends of the tubular components together,
and machining internally through the welded cap material to provide an internal diameter therethrough.

The thickness of the cap material is dependant on the wall thickness (T) of the joined tubular components. In the preferred embodiment of the present invention the cap at the end of each tubular component has a thickness of T/2+10%+3 mm, where T is the wall thickness of the finished part in mm.

Preferably the welded cap material is drilled or bored out to provide the necessary internal diameter. The machining tool to perform this operation may be inserted through one of the tubular components.

A heat treatment may be applied prior to machining internally through the welded cap material and a further machining step may be included to remove the flash expelled during the welding process from the external faces of the tubular components.

To achieve a satisfactory weld the surface velocity at the capped ends of the components should be in the range of 300-2000 feet per minute (1.5-10 m/s) and is preferably 400-600 feet per minute (2-3 m/s).

The pressure to be applied should be in the range of 50-800 metric tons and is preferably in the range of 400-600 metric tons.

The present invention will now be described with reference to the accompanying drawings in which.

Figure 1:
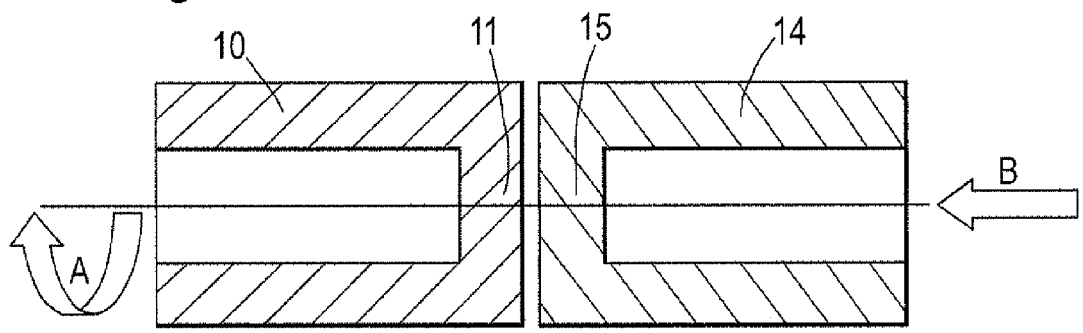
FIG. 1 is a cross-sectional view of two tubular components in accordance with the present invention which are to be joined by friction welding.
Figure 2:
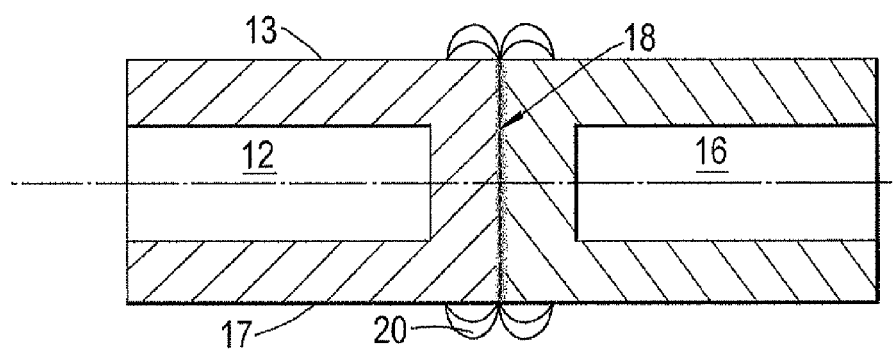
FIG. 2 is a cross-sectional view of the two components shown in FIG. 1 after they have been joined together by a friction welding.

Referring to FIG. 1 two tubular components 10 and 14 are provided with integral end caps 11 and 15 respectively. The end caps 11 and 15 are placed in abutting relationship and held together under pressure whilst the tubular component 10 is rotated. The tubular component 10 is rotated in the direction of arrow A in FIG. 1 whilst a pressure is applied in the direction of arrow B. This causes frictional heating and a friction welded joint 18 occurs at the interface between the two end caps 11 and 15, FIG. 2.

During the welding process weld material known as flash 20 is extruded from the joint 18. The flash 20 extrudes onto the outer surfaces 13 and 17 of the tubular components 10 and 14.

Figure 3:
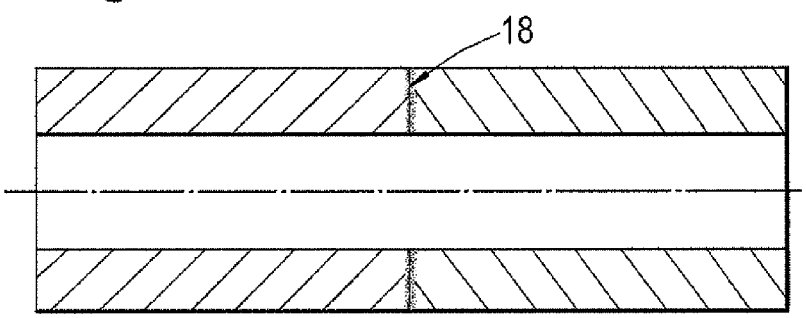
FIG. 3 is a cross-sectional view of the final assembly after friction welding and final machining.

On completion of the welding process the two end caps 11 and 15 are joined together. A drill or other machining tool (not shown) is then passed through an internal bore 12 or 16 in either of the tubular components 10 or 14. The machine tool cuts through the end caps 11 and 15 and the joint 18 to produce a single uniform bore thorough the two joined components, FIG. 3. In a further post processing operation the extruded flash 20 is removed from the outer surfaces 13 and 17.

By employing an integral solid cap 11, 15 of material at the end of each tube 10, 14 a good quality joint is achieved during friction welding. The thickness of the cap 11, 15 is chosen to achieve a successfully welded joint whilst being sufficiently thin to be easily removed by drilling or boring.

It will be appreciated that the thickness of the cap will depend upon the particular application and the process parameters being used. However the thickness of the cap can be related to the dimensions of the tube and the preferred thickness is defined as;

$$T/2+10\%+3 \text{ mm}$$

where T is the finished wall thickness in mm.

This ratio is applied to the caps at the end of both of the tubular components so that irrespective of the amount of upset in the welding process there should be approximately 6 mm of material left to be removed in the post-machining operation.

An advantage of this method is that flash need only be removed from the external surfaces of the tubular components. This method of joining therefore eliminates the difficulties of removing flash from any internal surfaces.

An unexpected benefit of this method is that it has been found to be easier to cut through and remove material from the solid end caps than to remove extruded flash from the internal surfaces. The metallurgical and stress profiles are also more consistent from the outside to the inside diameters of the tube as the material in the finished component is less affected by the material flow than when joining tubular ends.

A further additional benefit is that if tubular components of dissimilar materials are being joined the integral caps provide a barrier which allows different heat treatments to be applied. A post-weld treatment can thus be applied which differs from one side of the joint to the other and enables more optimised material properties in the weld. The central filler piece is then removed from the caps after the heat treatment has been applied.

It will be appreciated by one skilled in the art that the capped tubular geometry described could be applied to any steel, nickel or titanium alloys that are commonly used in the production of friction or inertia welded components. The capped tubular components could be manufactured by forging, extruding or machining.

For inertia or friction welded components used in aerospace applications the rotational speed used to achieve a successful weld is in the range of 50-400 RPM, for hollow components such as shafts this is preferably 200-400 RPM. This equates to a surface velocity of approximately 300-2000 feet per minute (1.5-10 m/s) for all components and 400-600 feet per minute (2-3 m/s) for shafts. The associated pressures are achieved by a load of 50-800 metric tons for all components and 400-600 metric tons for a hollow shaft.

The invention claimed is:

1. A method of joining tubular components together comprising:
    providing a cap of material at one end of a first tubular component;
    providing a cap of material at one end of a second tubular component
    placing the capped ends of the tubular components in an abutting relationship, the tubular components are placed in the abutting relationship after the cap is provided at the one end of each of the tubular components;
    holding the capped ends of the tubular components in abutment and applying a pressure whilst at least one of the components is rotated to generate frictional heat to weld the capped ends of the tubular components together so that flash is not expelled onto internal surfaces of the tubular components; and
    machining internally through the welded cap material to provide an internal diameter therethrough.
2. A method as claimed in claim 1, wherein each cap of material has a thickness which is dependent on the wall thickness (T) of the joined tubular components.
3. A method as claimed in claim 1, wherein the welded cap material is machined by inserting a machining tool through one of the tubular components.
4. A method as claimed in claim 1, wherein the welded cap material is drilled.
5. A method as claimed in claim 1, wherein the welded cap material is bored.
6. A method as claimed in claim 1, wherein a heat treatment is applied prior to machining internally through the welded cap material.
7. A method as claimed in claim 1, wherein a further machining operation is performed after the caps have been friction welded together to remove flash expelled during the welding process.
8. A method as claimed in claim 1, wherein flash is removed from the external surfaces of the tubular components after the caps have been friction welded together.
9. A method as claimed in claim 1, wherein at least one of the components is rotated at a speed such that the surface velocity at the capped ends of the components is in the range of 1.5-10 m/s.
10. A method as claimed in claim 1, wherein at least one of the components is rotated at a speed such that the surface velocity at the capped ends of the components is 2-3 m/s.
11. A method as claimed in claim 1, wherein the pressure applied is in the range of 50-800 metric tons.
12. A method as claimed in claim 1, wherein the pressure applied is in the range of 400-600 metric tons.
13. A method as claimed in claim 1, wherein the cap is an integral solid material completely covering an opening at the one end of each of the tubular components.

* * * * *